(12) United States Patent
Jeong et al.

(10) Patent No.: US 12,407,795 B2
(45) Date of Patent: Sep. 2, 2025

(54) COOKING DEVICE AND CONTROLLING METHOD THEREOF

(71) Applicant: SAMSUNG ELECTRONICS CO., LTD., Suwon-si (KR)

(72) Inventors: Juhee Jeong, Suwon-si (KR); Minjin Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/631,880

(22) Filed: Apr. 10, 2024

(65) Prior Publication Data

US 2024/0259535 A1     Aug. 1, 2024

Related U.S. Application Data

(63) Continuation of application No. PCT/KR2023/011691, filed on Aug. 8, 2023.

(30) Foreign Application Priority Data

Sep. 30, 2022 (KR) ..................... 10-2022-0125712

(51) Int. Cl.
    *G06V 10/56*     (2022.01)
    *G06V 20/68*     (2022.01)
    (Continued)

(52) U.S. Cl.
    CPC ............. *H04N 7/183* (2013.01); *G06V 10/56* (2022.01); *G06V 20/68* (2022.01); *H04N 23/60* (2023.01)

(58) Field of Classification Search
    CPC ........ H04N 23/60; H04N 23/62; H04N 7/183; G06V 10/80; G06V 10/811; F24C 7/085
    See application file for complete search history.

(56) References Cited

U.S. PATENT DOCUMENTS 11,229,311 B2    1/2022   Diao et al.
11,531,891 B2   12/2022   Maeng
(Continued)

FOREIGN PATENT DOCUMENTS

CN     111345699 A     6/2020
CN     113729500 A    12/2021
(Continued)

OTHER PUBLICATIONS

International Search Report (PCT/ISA/210) dated Nov. 29, 2023, issued by the International Searching Authority in International Application No. PCT/KR2023/011691.
(Continued)

*Primary Examiner* — Peet Dhillon
(74) *Attorney, Agent, or Firm* — Sughrue Mion, PLLC

(57) ABSTRACT

A cooking device includes a camera and a processor configured to: based on identifying a first event related to acquiring an image of a food ingredient arranged in the cooking device, adjust a set value for a parameter related to the camera and acquire a first set value, acquire, based on the first set value, an image of the food ingredient, based on identifying a second event while the image is being acquired, acquire a second set value, acquire a first image of the food ingredient based on the second set value, and provide the first image to a user, acquire a second image wherein the second set value used in acquiring the first image is changed to the first set value, and input the second image into an object recognition model configured to recognize the food ingredient, and acquire information on the food ingredient based on the second image.

20 Claims, 7 Drawing Sheets

(51) Int. Cl.
*H04N 7/18* (2006.01)
*H04N 23/60* (2023.01)

(56) References Cited

U.S. PATENT DOCUMENTS

| | | | |
|---|---|---|---|
| 11,687,776 B2 | 6/2023 | Jeong | |
| 11,856,287 B2 | 12/2023 | Ka et al. | |
| 2018/0324908 A1* | 11/2018 | Denker | H05B 6/6467 |
| 2019/0285283 A1 | 9/2019 | Ebrom et al. | |
| 2021/0401223 A1 | 12/2021 | Han et al. | |
| 2022/0078889 A1* | 3/2022 | Bhogal | F24C 7/085 |
| 2022/0138964 A1* | 5/2022 | Gintsburg | H04N 23/741 |
| | | | 382/103 |
| 2022/0154942 A1 | 5/2022 | Cheng | |
| 2022/0273139 A1* | 9/2022 | Mahapatra | G05B 13/0265 |
| 2022/0296037 A1* | 9/2022 | Spalding | G06V 20/00 |
| 2022/0311927 A1 | 9/2022 | Ka et al. | |
| 2023/0308769 A1* | 9/2023 | Xue | G06V 10/26 |

FOREIGN PATENT DOCUMENTS

| | | |
|---|---|---|
| CN | 215734964 U | 2/2022 |
| JP | 2013-214194 A | 10/2013 |
| KR | 10-2018-0083167 A | 7/2018 |
| KR | 10-2019-0105531 A | 9/2019 |
| KR | 10-2020-0092380 A | 8/2020 |
| KR | 10-2021-0074648 A | 6/2021 |
| KR | 10-2022-0041611 A | 4/2022 |
| KR | 10-2022-0049437 A | 4/2022 |
| KR | 10-2022-0059726 A | 5/2022 |

OTHER PUBLICATIONS

Written Opinion (PCT/ISA/237) dated Nov. 29, 2023, issued by the International Searching Authority in International Application No. PCT/KR2023/011691.

* cited by examiner

COOKING DEVICE AND CONTROLLING METHOD THEREOF

CROSS-REFERENCE TO RELATED APPLICATIONS

This application is a continuation of International Application No. PCT/KR2023/011691 designating the United States, filed on Aug. 8, 2023, in the Korean Intellectual Property Receiving Office and claiming priority to Korean Patent Application No. 10-2022-0125712 filed on Sep. 30, 2022, in the Korean Intellectual Property Office. The disclosures of each of these applications are incorporated by reference herein in their entireties.

BACKGROUND

1. Field

The disclosure relates to a cooking device and a controlling method thereof, and more particularly, to a cooking device that can recognize an image for a food ingredient, and a controlling method thereof.

2. Description of Related Art

Recently, functions of cooking devices such as an electric oven, an electric cooktop, an electric stove, etc. are becoming diversified. In particular, technologies for acquiring an image for a food ingredient arranged in a cooking device by using a camera, recognizing the food ingredient included in the image by using an object recognition model, and controlling the operation of the cooking device based on the recognition result are developing.

However, as a cooking process proceeds, the color of a food ingredient may change, and in this case, if an image for the food ingredient is acquired by automatically adjusting a set value for a parameter related to the camera according to the changed color, there is a problem that the recognition rate of the food ingredient for the acquired image may be degraded.

Even if the color of a food ingredient changes, an image of the food ingredient may be acquired by fixing a set value for a parameter related to the camera to an initial value without changing it. However, if an image acquired as such is provided to a user, there is a problem that the quality of the image provided to the user may be degraded.

SUMMARY

Provided is a cooking device that can acquire an image for a food ingredient while a cooking process is being performed and perform recognition for the food ingredient at a high recognition rate, and at the same time, provide an image of high quality including information on the food ingredient to a user, and a controlling method thereof.

According to an aspect of the disclosure, a cooking device includes: a camera; at least one memory storing at least one instruction; and at least one processor configured to execute the at least one instruction to: based on identifying a first event related to acquiring an image of a food ingredient arranged in the cooking device, adjust a set value for at least one parameter related to the camera and acquire a first set value, acquire, through the camera and based on the first set value, at least one image of the food ingredient arranged in the cooking device, based on identifying a second event while the at least one image is being acquired, acquire a second set value, acquire a first image of the food ingredient based on the second set value, and provide the first image to a user, acquire a second image wherein the second set value used in acquiring the first image is changed to the first set value, and input the second image into an object recognition model configured to recognize the food ingredient, and acquire information on the food ingredient based on the second image.

The at least one processor may be further configured to execute the at least one instruction to acquire the second image by changing the second set value to the first set value in data for the first image.

The at least one processor may be further configured to execute the at least one instruction to acquire the second image by inputting the first set value, the second set value, and the first image into a trained image acquisition model.

The cooking device may further include at least one sensor, and the first event may include at least one of receiving a user input for performing a cooking operation of the cooking device, detecting through the at least one sensor that a door of the cooking device was closed, or detecting through the at least one sensor that the food ingredient is arranged in the cooking device.

The second event may include at least one of identifying that a color of the food ingredient changed while a parameter stabilizing operation is being performed, detecting through the at least one sensor that an illumination around the cooking device changed while the parameter stabilizing operation is being performed, or receiving a user input requesting an image of the food ingredient while the parameter stabilizing operation is not being performed.

The cooking device may further include a communicator, and the at least one processor may be further configured to execute the at least one instruction to, based on acquiring the first image, control the communicator to transmit the first image to a user terminal of the user.

The cooking device may further include a display, the at least one processor may be further configured to execute the at least one instruction to, based on acquiring the first image, control the display to display the first image.

The cooking device may further include a light emitter, and the at least one processor may be further configured to execute the at least one instruction to control at least one of a color or a brightness of a light irradiated by the light emitter based on a color of the food ingredient included in the first image.

According to an aspect of the disclosure, a method of controlling a cooking device, the method including: based on identifying a first event related to acquiring an image of a food ingredient arranged in the cooking device, adjusting a set value for at least one parameter related to a camera of the cooking device and acquiring a first set value; acquiring, through the camera and based on the first set value, at least one image of the food ingredient arranged in the cooking device; based on identifying a second event while the at least one image is being acquired, acquiring a second set value, acquiring a first image of the food ingredient based on the second set value, and providing the first image to a user; acquiring a second image wherein the second set value used in acquiring the first image is changed to the first set value; and inputting the second image into an object recognition model configured to recognize the food ingredient, and acquiring information on the food ingredient based on the second image.

The acquiring the second image may further include acquiring the second image by changing the second set value to the first set value in data for the first image.

The acquiring the second image may further include acquiring the second image by inputting the first set value, the second set value, and the first image into a trained image acquisition model.

The first event may include at least one of receiving a user input for performing a cooking operation of the cooking device, detecting through at least one sensor that a door of the cooking device was closed, or detecting through the at least one sensor that the food ingredient is arranged in the cooking device.

The second event may include at least one of identifying that a color of the food ingredient changed while a parameter stabilizing operation is being performed, detecting through the at least one sensor that an illumination around the cooking device changed while the parameter stabilizing operation is being performed, or receiving a user input requesting an image of the food ingredient while the parameter stabilizing operation is not being performed.

The method may further include, based on acquiring the first image, transmitting the first image to a user terminal of the user.

The method may further include, based on acquiring the first image, displaying the first image.

According to an aspect of the disclosure, a non-transitory computer readable medium has instructions stored therein, which when executed by at least one processor cause the at least one processor to execute a method of controlling a cooking device, the method including: based on identifying a first event related to acquiring an image of a food ingredient arranged in the cooking device, adjusting a set value for at least one parameter related to a camera of the cooking device and acquiring a first set value; acquiring, through the camera and based on the first set value, at least one image of the food ingredient arranged in the cooking device; based on identifying a second event while the at least one image is being acquired, acquiring a second set value, acquiring a first image of the food ingredient based on the second set value, and providing the first image to a user; acquiring a second image wherein the second set value used in acquiring the first image is changed to the first set value; and inputting the second image into an object recognition model configured to recognize the food ingredient, and acquiring information on the food ingredient based on the second image.

The acquiring the second image may further include acquiring the second image by changing the second set value to the first set value in data for the first image.

The acquiring the second image may further include acquiring the second image by inputting the first set value, the second set value, and the first image into a trained image acquisition model.

The first event may include at least one of receiving a user input for performing a cooking operation of the cooking device, detecting through at least one sensor that a door of the cooking device was closed, or detecting through the at least one sensor that the food ingredient is arranged in the cooking device.

The second event may include at least one of identifying that a color of the food ingredient changed while a parameter stabilizing operation is being performed, detecting through the at least one sensor that an illumination around the cooking device changed while the parameter stabilizing operation is being performed, or receiving a user input requesting an image of the food ingredient while the parameter stabilizing operation is not being performed.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
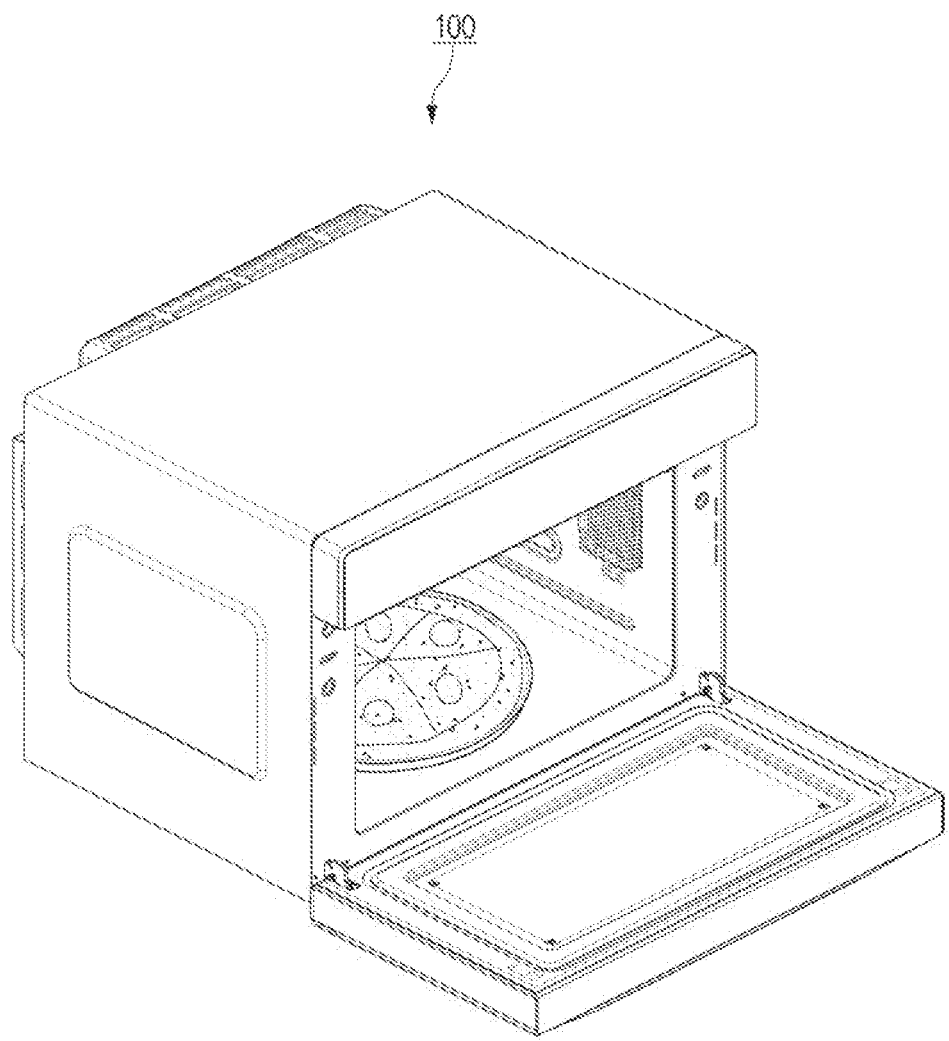
FIG. 1 is a diagram illustrating a cooking device according to one or more embodiments of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not intended to limit the scope of the disclosure to a specific embodiment, but rather they should be interpreted to include various modifications, equivalents, and/or alternatives of the embodiments of the disclosure. Also, with respect to the detailed description of the drawings, similar components may be designated by similar reference numerals.

Also, in describing the disclosure, in case it is determined that detailed explanation of related known functions or features may unnecessarily confuse the gist of the disclosure, the detailed explanation will be omitted.

In addition, the embodiments below may be modified into several different forms, and the scope of the technical idea of the disclosure is not limited to the embodiments below. Rather, these embodiments are provided to make the disclosure more sufficient and complete, and to fully convey the technical idea of the disclosure to those skilled in the art.

Further, the terms used in the disclosure are used only to explain specific embodiments, and are not intended to limit the scope of the disclosure. In addition, singular expressions include plural expressions, unless defined obviously differently in the context.

Also, in the disclosure, expressions such as "have," "may have," "include," and "may include" denote the existence of such characteristics (e.g.: elements such as numbers, functions, operations, and components), and do not exclude the existence of additional characteristics.

In addition, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including only A, (2) including only B, or (3) including both A and B.

Further, the expressions "first," "second," and the like used in the disclosure may describe various elements regardless of any order and/or degree of importance. Also, such expressions are used only to distinguish one element from another element, and are not intended to limit the elements.

Also, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element).

In contrast, the description that one element (e.g., a first element) is "directly coupled" or "directly connected" to another element (e.g., a second element) can be interpreted to mean that still another element (e.g., a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. The term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

Further, in the embodiments of the disclosure, "a module" or "a part" may perform at least one function or operation, and may be implemented as hardware or software, or as a combination of hardware and software. Also, a plurality of "modules" or "parts" may be integrated into at least one module and implemented as at least one processor, excluding "a module" or "a part" that needs to be implemented as specific hardware.

Meanwhile, various elements and areas in the drawings were illustrated schematically. Accordingly, the technical idea of the disclosure is not limited by the relative sizes or intervals illustrated in the accompanying drawings.

Hereinafter, the embodiments according to the disclosure will be described in detail with reference to the accompanying drawings, to the extent that those having ordinary skill in the art to which the disclosure pertains can easily carry out the embodiments.

FIG. 1 is a diagram illustrating a cooking device 100 according to one or more embodiments of the disclosure.

The cooking device 100 according to the disclosure refers to a device that can cook a food ingredient by providing heat to the food ingredient by using gas, electricity, vapor, etc. For example, the cooking device 100 according to the disclosure may be an electric oven as illustrated in FIG. 1, and other than this, any devices that can cook a food ingredient such as a cooktop and an electric range, etc. can fall under the cooking device 100 according to the disclosure without a limitation on the types.

Specifically, the cooking device 100 according to the disclosure may acquire an image for a food ingredient through a camera 110, and provide the acquired image to a user. Also, the cooking device 100 may acquire information on the food ingredient by analyzing the image acquired through the camera 110, and control a cooking operation based on the information on the food ingredient. For example, if it is identified that the color of the surface of the food ingredient changed while a cooking process proceeds as a result of analyzing the image, the cooking device 100 may control a cooking operation, provide a guide message to the user, or further provide information on a recommended recipe to the user based on the information on the changed color of the surface of the food ingredient.

In other words, the cooking device 100 may perform recognition for a food ingredient by acquiring an image for the food ingredient while a cooking process proceeds, and at the same time, provide an image including information on the food ingredient to the user. Hereinafter, various embodiments will be described with reference to FIGS. 2 to 7.

Figure 2:
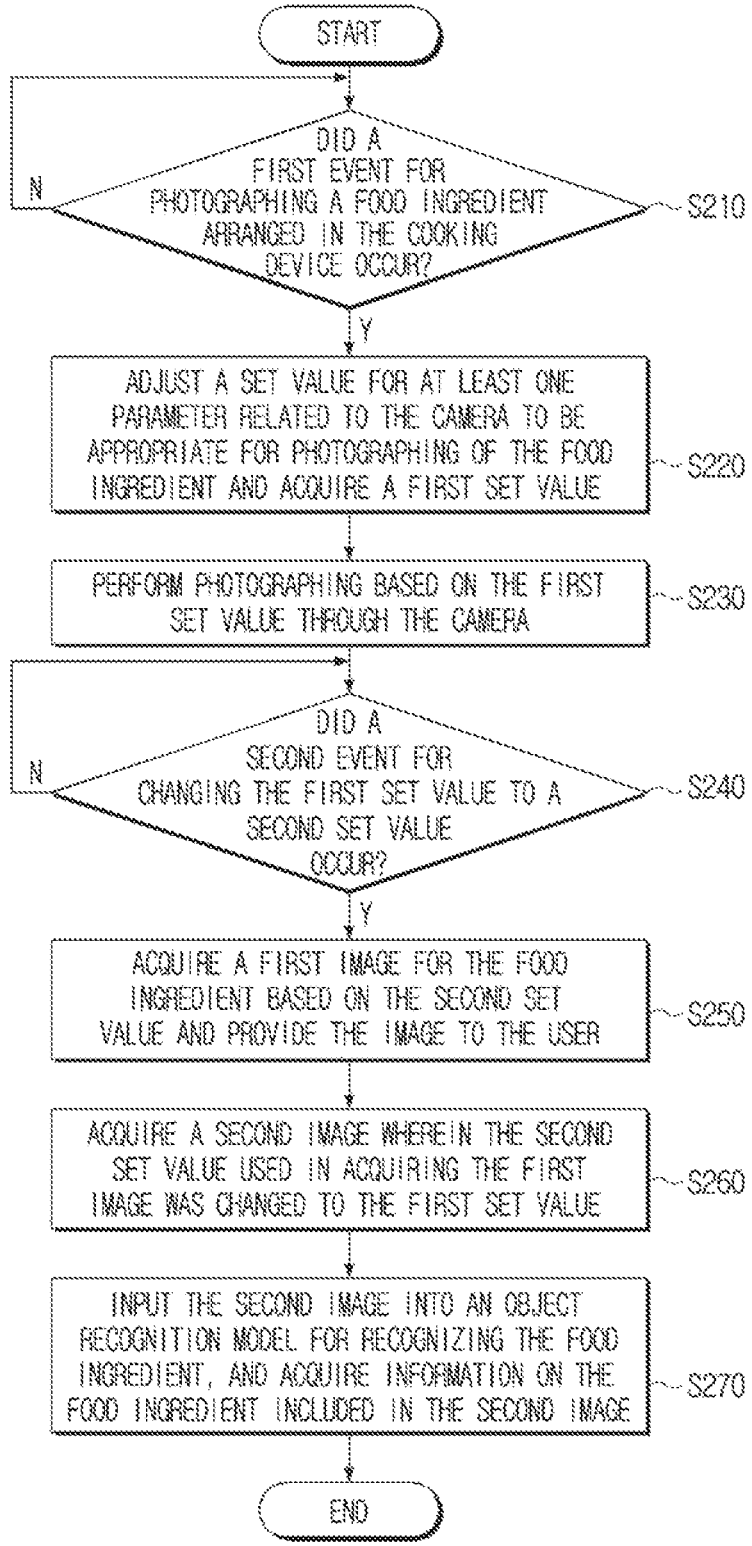
FIG. 2 is a flow chart illustrating a controlling method of a cooking device according to one or more embodiments of the disclosure.

FIG. 2 is a flow chart illustrating a method of controlling the cooking device 100 according to one or more embodiments of the disclosure.

Referring to FIG. 2, the cooking device 100 according to the disclosure may identify whether a first event for photographing a food ingredient arranged in the cooking device 100 occurred in operation S210. In the description of the disclosure, "a first event" is used as a term for generally referring to an event that becomes a condition for initiating photographing of a food ingredient arranged in the cooking device 100. For example, the first event may include at least one of a case wherein a user input for performing a cooking operation of the cooking device 100 was received, a case wherein it is detected that a door included in the cooking device 100 was closed through at least one sensor 150 included in the cooking device 100, or a case wherein it is detected that a food ingredient was arranged in the cooking device 100 through the at least one sensor 150.

If the first event is not identified in operation S210-N, the cooking device 100 may maintain the current operation, and identify again whether the first event occurred until the first event occurs in operation S210. In contrast, if the first event is identified in operation S210-Y, the cooking device 100 may adjust a set value for at least one parameter related to the camera 110 to be appropriate for the photographing of the food ingredient, and acquire a first set value in operation S220.

In the description of the disclosure, "at least one parameter" is used as a term for generally referring to parameters related to photographing by the camera 110. For example, the at least one parameter may include a focus, exposure, and a white balance of the camera 110, but is not limited thereto.

The feature of adjusting the set value for the at least one parameter to be appropriate for photographing of a food ingredient may mean adjusting the set value for the at least one parameter to a set value within a threshold range that can stabilize photographing for the food ingredient, based on various factors such as the color of the food ingredient, the focal distance from the food ingredient, the illumination around the cooking device 100, etc. For example, the cooking device 100 may adjust a set value for exposure based on the illumination around the cooking device 100, and may thereby adjust the brightness of an image acquired as a result of photographing to become brightness within a predetermined threshold range. The threshold ranges of set values for each parameter that can stabilize photographing may be changed according to the setting by the developer or the user.

In particular, in case the at least one parameter includes the focus, the exposure, and the white balance, an operation of automatically adjusting set values for the focus, the exposure, and the white balance may be referred to as a so-called "3A (Auto Focus, Auto Exposure, Auto White Balance) stabilizing operation." Hereinafter, the operation of adjusting the set value for the at least one parameter to be appropriate for photographing of a food ingredient will be simply referred to as a "parameter stabilizing operation."

Also, in the disclosure, the first set value for the at least one parameter means a set value that was initially acquired by performing a parameter stabilizing operation, i.e., the initial set value.

The cooking device 100 may perform a cooking operation in response to occurrence of the first event. In addition, the cooking device 100 may perform a cooking operation based on a user input that was separately input before the occurrence of the first event or after the occurrence of the first event. For example, in case the first event is a case wherein a user input for performing a cooking operation of the cooking device 100 was received, the cooking device 100 may perform a predetermined cooking operation in response to identification of the first event. Meanwhile, in case the first event is a case wherein it is detected that a door included in the cooking device 100 was closed, the cooking device 100 may perform a predetermined cooking operation based on a separate user input for performing the cooking operation.

When the first set value is acquired, the cooking device 100 may perform photographing based on the first set value through the camera 110 in operation S230. That is, if the first set value is acquired as the parameter stabilizing operation according to the disclosure was completed, the cooking device 100 may initiate photographing of the food ingredient in a state wherein the set value for the at least one parameter was adjusted to be appropriate for the photographing of the food ingredient.

Also, when the first set value is acquired, the cooking device 100 may store the acquired first set value in a memory 120. This is for acquiring a second image by post-processing the first image by using the first set value, as will be described below.

While photographing is being performed based on the first set value, the cooking device 100 may identify whether a second event for changing the first set value to a second set value occurred in operation S240. Here, the second event is a term for generally referring to situations wherein it is necessary to adjust the set value for the at least one parameter to be appropriate for photographing of the food ingredient. That is, while a cooking operation is being performed, various factors such as the color of the food ingredient, the focal distance from the food ingredient, the illumination around the cooking device 100, etc. may change, and in this case, the cooking device 100 may acquire a new set value according to the parameter stabilizing operation.

For example, the second event may include at least one of a case wherein it is identified that the color of the food ingredient changed while the parameter stabilizing operation according to the disclosure is being performed, a case wherein it is detected that the illumination around the cooking device 100 changed through the at least one sensor 150 while the parameter stabilizing operation is being performed, or a case wherein a user input requesting an image for the food ingredient is received while the parameter stabilizing operation is not being performed.

If the second event is not identified in operation S240-N, the cooking device 100 may maintain the current operation, and identify again whether the second event occurred in operation S240. In contrast, if the second event is identified in operation S240-Y, the cooking device 100 may acquire the first image for the food ingredient based on the second set value, and provide the image to the user in operation S250.

In the disclosure, the second set value for the at least one parameter means a set value that was acquired as a result of performing the parameter stabilizing operation again after the first set value which is the initial set value was acquired by performing the parameter stabilizing operation, i.e., the current set value.

The cooking device 100 may acquire the first image for the food ingredient based on the second set value which is a set value adjusted from the set value for the at least one parameter to be appropriate for the photographing of the current food ingredient. In the disclosure, the first image is an image acquired based on the second set value appropriate for the photographing of the current food ingredient, and it may be an image appropriate for a case wherein information on the current cooking state is provided to the user.

The cooking device 100 may acquire the second image wherein the second set value used in acquiring the first image was changed to the first set value in operation S260. Specifically, the cooking device 100 may acquire the second image by performing post-processing for the first image, or acquire the second image by using a neural network model for post-processing of an image.

In the disclosure, the second image is an image that was acquired by changing the set value of the first image to the first set value which is the initial set value, and refers to an image for being input into an object recognition model. That is, in object recognition, it would be easy in terms of the object recognition rate to use the second image having the first set value which is the initial set value rather than the first image which can clearly indicate the state of the current food ingredient, and thus the cooking device 100 may not input the first image into the object recognition model, but input the second image having the initial set value into the object recognition model.

In one or more embodiments, the cooking device 100 may acquire the second image by changing the second set value to the first set value in data for the first image. For example, in a case where the first set value includes the feature that the r gain value of the white balance is 20, and the second set value includes the feature that the r gain value of the white balance is 23, the cooking device 100 may subtract the r gain value of the second set value from the data for the first image as much as 3, and may thereby acquire the second image wherein the second set value was changed to the first set value in the data for the first image.

Also, in one or more embodiments, the cooking device 100 may input the first set value, the second set value, and the first image into a trained image acquisition model, and acquire the second image. Here, the image acquisition model refers to a neural network model that was trained to, if the initial set value for the at least one parameter, the original image, and the current set value for the original image are input, output a new image having the initial set value. For example, if the first set value which is the initial set value, the first image, and the second set value used in acquiring the first image are input, the image acquisition model may output the second image having the first set value. The image acquisition model may not only be implemented as an on-device in the cooking device 100 itself, but may also be implemented in an external device such as a server.

When the second image is acquired, the cooking device 100 may input the second image into the object recognition model for recognizing a food ingredient, and acquire information on the food ingredient included in the second image in operation S270. Then, when the information on the food ingredient included in the second image is acquired, the cooking device 100 may perform various operations such as controlling the cooking operation based on the information on the food ingredient, providing a guide message to the user, or further providing information on a recommended recipe to the user.

The object recognition model according to the disclosure refers to a neural network model that can acquire information on an object included in an image when an image is input. In particular, the object recognition model may be trained to output information on the type of a food ingredient included in an image and information on the color of the food ingredient, etc. The object recognition model may not only be implemented as an on-device part of the cooking device 100 itself, but may also be implemented in an external device such as a server.

According to the embodiment described above with reference to FIG. 2, the cooking device 100 may acquire the first image based on the second set value which is the current set value appropriate for photographing of the current food ingredient and provide the image to the user, and at the same time, acquire the second image based on the first set value which is the initial set value according to parameter stabilization and perform object recognition. Accordingly, the cooking device 100 can acquire an image for the food ingredient while the cooking process is being performed and perform recognition for the food ingredient at a high recognition rate, and at the same time, provide an image including clear information on the food ingredient to the user.

Figure 3:
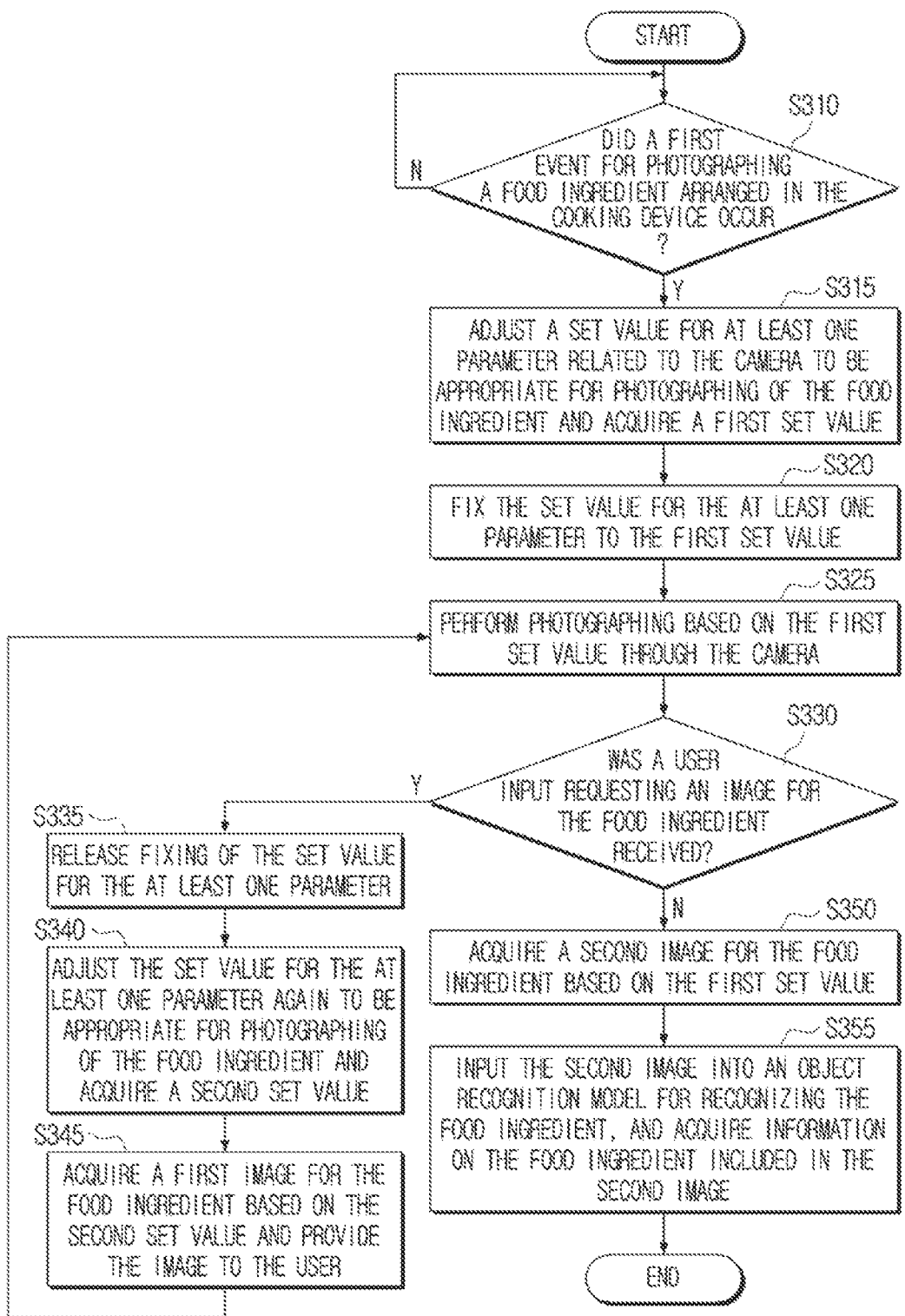
FIG. 3 is a flow chart for illustrating an embodiment evaluating whether a parameter stabilizing operation was activated according to the disclosure.

FIG. 3 is a flow chart for illustrating an embodiment evaluating whether a parameter stabilizing operation was activated according to the disclosure.

Referring to FIG. 3, the cooking device 100 according to the disclosure may identify whether the first event for photographing a food ingredient arranged in the cooking device 100 occurred in operation S310. Then, if the first event is identified in operation S310 -Y, the cooking device 100 may adjust a set value for at least one parameter related to the camera 110 to be appropriate for photographing of the food ingredient and acquire the first set value in operation S315. As the process of identifying whether the first event occurred and the parameter stabilizing operation were described above with reference to FIG. 2, overlapping explanation regarding the same content will be omitted.

When the first set value is acquired, the cooking device 100 may fix the set value for the at least one parameter to the first set value in operation S320. Then, the cooking device 100 may perform photographing based on the first set value through the camera 110 in operation S325. In other words, if the first set value which is the initial set value is acquired as a result of the parameter stabilizing operation being performed, the cooking device 100 may stop the parameter stabilizing operation, and perform photographing based on the first set value.

The cooking device 100 may perform different operations according to whether a user input requesting an image for the food ingredient is received in operation S330. Specifically, if a user input requesting an image for the food ingredient is received in operation S330-Y, the cooking device 100 may release fixing of the set value for the at least one parameter in operation S335. Then, the cooking device 100 may adjust the set value for the at least one parameter again to be appropriate for the photographing of the food ingredient, and acquire the second set value in operation S340, and acquire the first image for the food ingredient based on the second set value and provide the image to the user in operation S345.

In other words, after the parameter stabilizing operation was stopped and while the photographing is performed based on the first set value, in a case where a user input requesting an image for the food ingredient is received, it would be inappropriate to provide an image acquired based on the first set value but not the current set value to the user. Accordingly, the cooking device 100 may perform the parameter stabilizing operation again and acquire the second set value, and provide an image acquired based on the second set value to the user.

When the first image acquired based on the second set value is provided to the user, the cooking device 100 may stop the parameter stabilizing operation again, and perform the photographing of the food ingredient based on the first set value in operation S325.

If a user input requesting an image for the food ingredient is not received in operation S330-N, the cooking device 100 may acquire the second image for the food ingredient based on the first set value in operation S350. Then, the cooking device 100 may input the second image into the object recognition model for recognizing a food ingredient, and acquire information on the food ingredient included in the second image in operation S355.

In other words, after the parameter stabilizing operation was stopped and while the photographing is performed based on the first set value, unless a situation for performing the parameter stabilizing operation again such as a case wherein a user input requesting an image for the food ingredient is received occurs, the cooking device 100 may acquire the second image for the food ingredient based on the fixed first set value in a state wherein the parameter stabilizing operation was stopped, and perform object recognition by using the second image.

According to the embodiment described above with reference to FIG. 3, the cooking device 100 may perform recognition for a food ingredient at a high recognition rate by fixing the set value according to the parameter stabilizing operation while a cooking process is performed, and at the same time, acquire again the set value according to the parameter stabilizing operation when acquiring an image to be provided to the user, and can thereby provide an image of high quality for the food ingredient to the user.

Figure 4:
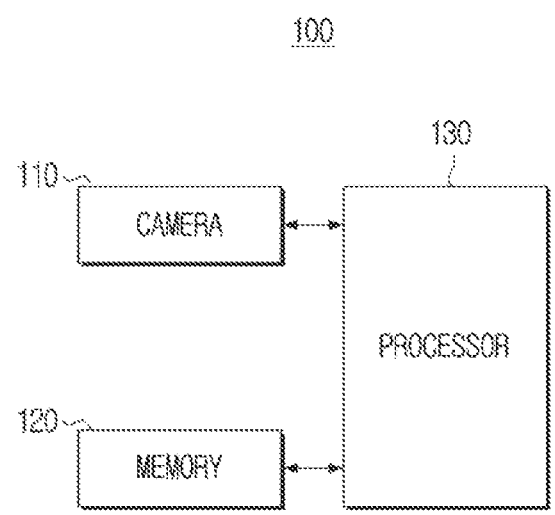
FIG. 4 is a block diagram schematically illustrating a configuration of a cooking device according to one or more embodiments of the disclosure.
Figure 5:
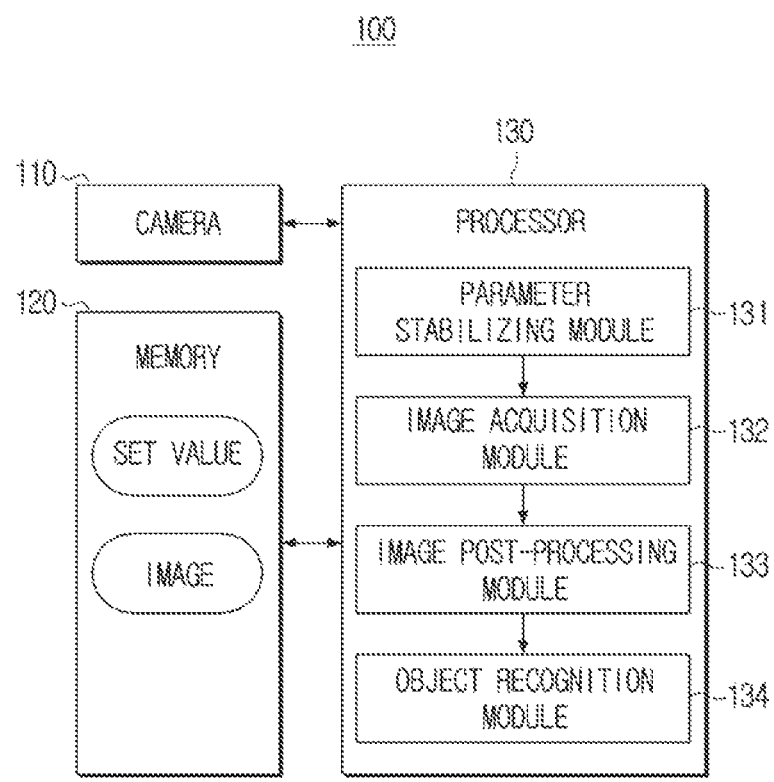
FIG. 5 is a block diagram illustrating a plurality of modules according to one or more embodiments of the disclosure.

FIG. 4 is a block diagram schematically illustrating a configuration of the cooking device 100 according to one or more embodiments of the disclosure. Also, FIG. 5 is a block diagram illustrating a plurality of modules according to one or more embodiments of the disclosure.

As illustrated in FIG. 4, the cooking device 100 according to one or more embodiments of the disclosure may include a camera 110, a memory 120, and a processor 130.

The camera 110 may acquire an image for at least one object. Specifically, the camera 110 may include an image sensor, and the image sensor may convert light that comes in through a lens into an electric image signal.

In particular, in the various embodiments according to the disclosure, the processor 130 may acquire an image for a food ingredient through the camera 110. Specifically, the processor 130 may acquire the second image for a food ingredient based on the first set value for the at least one parameter. Also, the processor 130 may acquire the first image for a food ingredient based on the second set value for the at least one parameter.

In the memory 120, at least one instruction regarding the cooking device 100 may be stored. Also, in the memory 120, an operating system (O/S) for driving the cooking device 100 may be stored. In addition, in the memory 120, various kinds of software programs or applications for the cooking device 100 to operate according to the various embodiments of the disclosure may be stored. Further, the memory 120 may include a semiconductor memory such as a flash memory or a magnetic storage medium such as a hard disk.

Specifically, in the memory 120, various kinds of software modules for the cooking device 100 to operate according to the various embodiments of the disclosure may be stored, and the processor 130 may control the operations of the cooking device 100 by executing the various kinds of software modules stored in the memory 120. That is, the memory 120 may be accessed by the processor 130, and reading/recording/correction/deletion/update, etc. of data by the processor 130 may be performed.

In the disclosure, the term memory 120 may be used as meaning including the memory 120, a ROM and a RAM inside the processor 130, or a memory card installed on the cooking device 100 (e.g., a micro SD card, a memory stick).

In particular, in the various embodiments according to the disclosure, images for food ingredients including the first image and the second image according to the disclosure may be stored. Also, in the memory 120, the set values for the at least one parameter according to the disclosure, i.e., the first set value, the second set value, etc. may be stored. In addition, in the memory 120, information on neural network models including the image acquisition model and the object recognition model according to the disclosure may be stored. Not only that, in the memory 120, information indicating what the first event and the second event according to the disclosure are may be stored.

Other than the above, various kinds of necessary information within a range for achieving the purpose of the disclosure may be stored in the memory 120, and the information stored in the memory 120 may be updated as it is received from an external device or input by the user.

The processor 130 controls the overall operations of the cooking device 100. Specifically, the processor 130 may be connected with the components of the cooking device 100 including the camera 110 and the memory 120, and may control the overall operations of the cooking device 100 by executing the at least one instruction stored in the memory 120 as described above.

The processor 130 may be implemented in various methods. For example, the processor 130 may be implemented as at least one of an application specific integrated circuit (ASIC), an embedded processor, a microprocessor, a hardware control logic, a hardware finite state machine (FSM), or a digital signal processor (DSP). Meanwhile, in the disclosure, the term processor 130 may be used as meaning including a central processing unit (CPU), a graphic processing unit (GPU), and a microprocessor unit (MPU), etc.

In particular, the processor 130 may implement the various embodiments according to the disclosure by using a plurality of modules as illustrated in FIG. 5. Here, the plurality of modules may include a parameter stabilizing module 131, an image acquisition module 132, an image post-processing module 133, and an object recognition module 134, and may be implemented as a software module or a hardware module. Hereinafter, explanation will be described on the premise of a case wherein the plurality of modules according to the disclosure are implemented by the processor 130, but depending on embodiments, some modules among the plurality of modules may be implemented in forms of being included in a separate processor 130 for image processing.

The processor 130 may identify whether the first event for photographing a food ingredient arranged in the cooking device 100 occurred. Then, if the first event is identified, the processor 130 may acquire the first set value through the parameter stabilizing module 131.

The parameter stabilizing module 131 refers to a module that can acquire a set value by adjusting the set value for the at least one parameter related to the camera 110 to be appropriate for photographing of a food ingredient. Specifically, the parameter stabilizing module 131 may adjust the set value for the at least one parameter to a set value within the threshold range that can stabilize photographing of a food ingredient by performing a predefined algorithm based on the amount of light that is currently exposed to the camera 110, the distance from a subject (e.g., a food ingredient), the color of the subject, etc. Accordingly, the parameter stabilizing module 131 may acquire the first set value and the second set value according to the disclosure. Further, the parameter stabilizing module 131 may store the acquired set values in the memory 120, and also transmit the set values to the image acquisition module 132.

When the first set value is acquired, the processor 130 may perform photographing based on the first set value through the camera 110. Also, the processor 130 may identify whether the second event for changing the first set value to the second set value while the photographing is being performed based on the first set value occurred.

If the second event is identified, the processor 130 may acquire the first image by using the image acquisition module 132. The image acquisition module 132 refers to a module that can acquire an image for a food ingredient through the camera 110. Specifically, the image acquisition module 132 may acquire an image for a food ingredient based on the set value received from the parameter stabilizing module 131. For example, the image acquisition module 132 may acquire the first image for a food ingredient based on the second set value, and provide the image to the user. Further, the image acquisition module 132 may store the acquired image in the memory 120, and also transmit the image to the image post-processing module 133.

The processor 130 may acquire the second image by using the image post-processing module 133. The image post-processing module 133 refers to a module that can acquire the second image by performing post-processing on the first image. Specifically, the image post-processing module 133 may acquire the second image wherein the second set value used in acquiring the first image was changed to the first set value. In one or more embodiments, the image post-processing module 133 may acquire the second image by changing the second set value to the first set value in the data for the first image, or acquire the second image by inputting the first set value, the second set value, and the first image into the trained image acquisition model. Further, the image post-processing module 133 may transmit the second image acquired as a result of post-processing for the first image to the object recognition module 134.

When the second image is acquired, the processor 130 may acquire information on the food ingredient included in the second image by using the object recognition module 134. The object recognition module 134 refers to a module that can recognize a food ingredient included in an image, and in particular, it may be implemented in a form of an object recognition model trained to identify an object included in an input image. Specifically, when the second image is received from the image post-processing module 133, the object recognition module 134 may perform object recognition for the second image and acquire information on the food ingredient included in the second image.

Other than the above, the various embodiments according to the disclosure based on control by the processor 130 were described above with reference to FIGS. 1 to 3, and thus overlapping explanation will be omitted.

Figure 6:
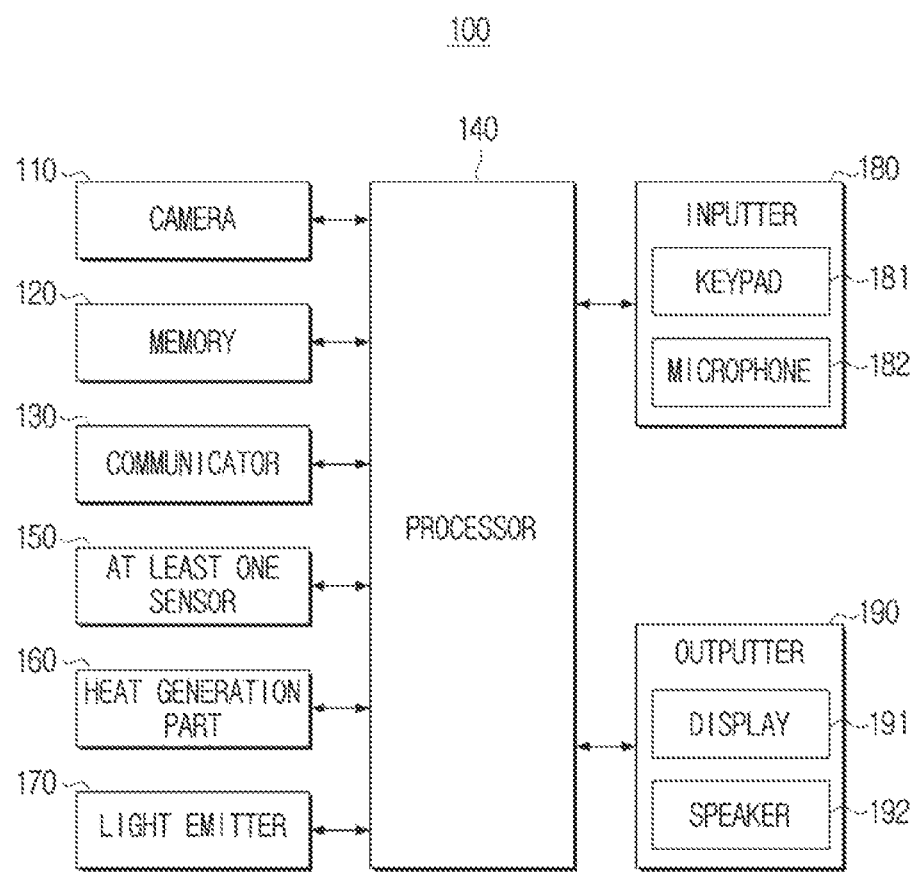
FIG. 6 is a block diagram illustrating in detail a configuration of a cooking device according to one or more embodiments of the disclosure.

FIG. 6 is a block diagram illustrating in detail a configuration of the cooking device 100 according to one or more embodiments of the disclosure.

As illustrated in FIG. 6, the cooking device 100 according to one or more embodiments of the disclosure may further include a communicator 140, at least one sensor 150, a heat generation part 160, a light emitter 170, an inputter 180, and an outputter 190. However, the components as illustrated in FIG. 4 and FIG. 6 are merely exemplary ones, and in carrying out the disclosure, it is obvious that new components can be added in addition to the components as illustrated in FIG. 4 and FIG. 6, or some components can be omitted.

The communicator 140 may include a circuit, and perform communication with an external device. Specifically, the processor 130 may receive various kinds of data or information from an external device connected through the communicator 140, and transmit various kinds of data or information to the external device.

The communicator 140 may include at least one of a WiFi module, a Bluetooth module, a wireless communication module, an NFC module, or a ultra wide band (UWB) module. Specifically, a WiFi module and a Bluetooth module may perform communication by a WiFi method and a Bluetooth method, respectively. In the case of using a WiFi module or a Bluetooth module, various types of connection information such as an SSID, etc. is transmitted and received first, and connection of communication is performed by using the information, and various types of information can be transmitted and received thereafter.

Also, a wireless communication module may perform communication according to various communication standards such as IEEE, Zigbee, 3rd Generation (3G), 3rd Generation Partnership Project (3GPP), Long Term Evolution (LTE), 5th Generation (5G), etc. Also, an NFC module may perform communication by a near field communication (NFC) method of using a 13.56 MHz band among various RF-ID frequency bands such as 135 kHz, 13.56 MHz, 433 MHz, 860-960 MHz, and 2.45 GHz. In addition, a UWB module may correctly measure a Time of Arrival (ToA) which is the time when a pulse reaches a target, and an Angle of Arrival (AoA) which is a pulse arrival angle in a transmission device through communication between UWB antennas, and accordingly, the UWB module can perform correct distance and location recognition in an error range of within scores of cm indoors.

In particular, in the various embodiments according to the disclosure, if the first image is acquired, the processor 130 may control the communicator 140 to transmit the first image to the user terminal of the user. Also, the processor 130 may receive a user input for performing a cooking operation through the communicator 140. Then, the processor 130 may control the communicator 140 to transmit input data of neural network models to a server including the neural network models (e.g., the image acquisition model, the object recognition model) according to the disclosure, and receive output data of the neural network models through the communicator 140.

The at least one sensor 150 may detect various kinds of information inside and outside the cooking device 100. In particular, the at least one sensor 150 may include a door sensor, a weight detection sensor, and an illumination sensor. Also, the at least one sensor 150 may include at least one of a global positioning system (GPS) sensor, a gyro sensor (a gyroscope), an acceleration sensor (an accelerometer), a LiDar sensor, an inertial sensor (e.g., an inertial measurement unit (IMU)), or a motion sensor. Not only that, the at least one sensor 150 may include various types of sensors such as a temperature sensor, a humidity sensor, an infrared sensor, a bio sensor, etc.

In particular, in the various embodiments according to the disclosure, the processor 130 may detect opening or closing of the door included in the cooking device 100 through the door sensor. Then, if it is detected that the door was closed through the door sensor, the processor 130 may identify that the first event occurred, and if it is detected that the door was opened through the door sensor, the processor 130 may detect that the cooking operation was stopped.

Also, the processor 130 may detect whether a food ingredient is arranged in the cooking device 100 through the weight detection sensor. Then, if it is detected that a food ingredient is arranged in the cooking device 100 through the weight detection sensor, the processor 130 may identify that the first event occurred.

In addition, the processor 130 may detect the illumination around the cooking device 100 through the illumination sensor while the parameter stabilizing operation is being performed. Then, if it is detected that the illumination around the cooking device 100 was changed through the illumination sensor, the processor 130 may change the set value for the at least one parameter based on the changed illumination.

The heat generation part 160 refers to a component that can heat food. In particular, in a case where the cooking device 100 is implemented as an electric oven or an electric range, the heat generation part 160 may generate heat by supply of power, and the heat source in this case may be a radiant heater or an induction heater, etc. Operation of the heat generation part 160 or the heat generation temperature and the heat generation time of the heat generation part 160 may be performed based on a user input, and also may be performed by the processor 130 based on information on a food ingredient included in an image.

The light emitter 170 refers to a component that includes a light source, and can irradiate light to the inside of the cooking device 100 by the light source. Specifically, the light emitter 170 may include a plurality of light sources, and the processor 130 may irradiate lights of various colors to the inside of the cooking device 100 according to each of the plurality of light sources or a combination of the plurality of light sources. For example, the light emitter 170 may include a plurality of light-emitting diode (LED) light sources, but is not limited thereto.

In particular, the processor 130 may control at least one of the color or the brightness of light irradiated by the light emitter 170 based on the color of a food ingredient included in the first image. For example, in case the food ingredient is a croissant, a cool daylight color may be irradiated at the time point when a cooking operation was initiated such that the croissant in a dough state can be seen clearly, and a yellow light may be irradiated as the croissant becomes baked while the cooking operation proceeds, and the croissant may thereby be seen more yellow. Accordingly, the cooking device 100 can provide a better image to the user by using a lighting that is appropriate for the type of a food ingredient and the cooking state.

The inputter 180 may include a circuit, and the processor 130 may receive a user instruction for controlling the operation of the cooking device 100 through the inputter 180. Specifically, the inputter 180 may consist of components such as a microphone 182, a camera 110, a remote control signal receiver, etc. Also, the inputter 180 may be implemented in a form of being included in the display 191 as a touch screen. In particular, the microphone 182 may receive a voice signal, and convert the received voice signal into an electric signal.

In particular, in the various embodiments according to the disclosure, the processor 130 may receive a user input for performing a cooking operation, a user input for setting the time when the cooking operation is performed, a user input for finishing the cooking operation, a user input for requesting an image for a food ingredient, etc. through the inputter 180.

The outputter 190 may include a circuit, and the processor 130 may output various functions that can be performed by the cooking device 100 through the outputter 190. Also, the outputter 190 may include at least one of a display 191, a speaker 192, or an indicator.

The display 191 may output image data by control by the processor 130. Specifically, the display 191 may output an image stored in advance in the memory 120 by control by the processor 130.

In particular, the display 191 according to one or more embodiments of the disclosure may display a user interface stored in the memory 120. The display 191 may be implemented as a liquid crystal display (LCD) panel, organic light emitting diodes (OLED), etc. Also, it is possible that the display 191 is implemented as a flexible display, a transparent display, etc. depending on cases. However, the display 191 according to the disclosure is not limited to specific types. The speaker 192 may output audio data by control by the processor 130, and the indicator may be turned on by control by the processor 130.

In particular, in the various embodiments according to the disclosure, if the first image according to the disclosure is acquired, the processor 130 may control the display 191 to display the first image. Other than the above, the processor 130 may display information indicating the proceeding situation of a cooking operation, a user interface for receiving a user input, etc.

Figure 7:
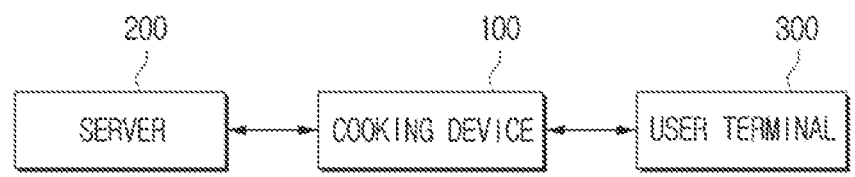
FIG. 7 is a block diagram illustrating a system according to one or more embodiments of the disclosure.

FIG. 7 is a block diagram illustrating a system according to one or more embodiments of the disclosure.

As illustrated in FIG. 7, a system according to one or more embodiments of the disclosure may include the cooking device 100, a server 200, and a user terminal 300.

In the above, explanation was described on the premise of a case wherein the various embodiments according to the disclosure are implemented by the cooking device 100, but some processes in the embodiments described above may be performed through the server 200, and some processes may be performed through the user terminal 300.

In the disclosure, the server 200 refers to a device wherein neural network models according to the disclosure are implemented. Specifically, the server 200 may include neural network models including the image acquisition model and the object recognition model according to the disclosure.

In one or more embodiments, the server 200 may include the image acquisition model. In this case, the cooking device 100 may control the communicator to transmit the first set value which the initial set value for the at least one parameter, the second set value which is the current set value, and the data for the first image to the server 200. When the first set value, the second set value, and the data for the first image are received from the cooking device 100, the server 200 may input the first set value, the second set value, and the data for the first image into the trained image acquisition model, and acquire the second image wherein the second set value used in acquiring the first image was changed to the first set value, and transmit the image to the cooking device 100.

Also, in one or more embodiments, the server 200 may include an object recognition model. The cooking device 100 may control the communicator to transmit data for the second image to the server 200. When the data for the second image is received from the cooking device 100, the server 200 may input the data for the second image into the object recognition model, and acquire information on a food ingredient included in the second image.

Meanwhile, in a case where the server 200 includes the image acquisition model together with the object recognition model, the server 200 may acquire the second image by using the image acquisition model, acquire information on a food ingredient included in the second image by using the object recognition model, and transmit the information on the food ingredient included in the second image together with the data for the second image to the cooking device 100 afterwards.

In the disclosure, the user terminal 300 refers to a device that can receive information on a situation wherein a cooking operation is performed, and display the information. For example, the user terminal device 300 may be implemented as a smartphone, a tablet PC, a smart watch, etc., but is not limited thereto.

In one or more embodiments, if the first image is acquired, the cooking device 100 may control the communicator to transmit the first image to the user terminal 300. Then, when the first image is received, the user terminal 300 may output the first image through the display of the user terminal 300.

The user terminal 300 may receive a user input for performing a cooking operation, a user input for setting the time when the cooking operation is performed, a user input for finishing the cooking operation, a user input for requesting an image for a food ingredient, etc., and transmit the received user input to the cooking device 100.

The controlling method of the cooking device 100 according to the aforementioned embodiment may be implemented as a program and provided to the cooking device 100. In particular, a program including the controlling method of the cooking device 100 may be provided while being stored in a non-transitory computer readable medium.

Specifically, in a non-transitory computer readable recording medium including a program executing the controlling method of the cooking device 100, the controlling method of the cooking device 100 includes the operations of, based on identifying a first event for photographing a food ingredient arranged in the cooking device 100, adjusting a set value for at least one parameter related to the camera of the cooking device 100 to be appropriate for photographing of the food ingredient and acquiring a first set value, based on identifying a second event for changing the first set value to a second set value while the photographing is being performed based on the first set value through the camera, acquiring a first image for the food ingredient based on the second set value and providing the image to a user, acquiring a second image wherein the second set value used in acquiring the first image was changed to the first set value, and inputting the second image into an object recognition model for recognizing the food ingredient, and acquiring information on the food ingredient included in the second image.

In the above, the controlling method of the cooking device 100, and the computer-readable recording medium including a program executing the controlling method of the cooking device 100 were described briefly, but this is only for omitting overlapping explanation, and the various embodiments regarding the cooking device 100 can be applied to the controlling method of the cooking device 100, and the computer-readable recording medium including a program executing the controlling method of the cooking device 100.

According to the various embodiments of the disclosure as described above, the cooking device 100 can acquire an image for a food ingredient while a cooking process is being performed and perform recognition for the food ingredient at a high recognition rate, and at the same time, provide an image including clear information on the food ingredient to the user.

Functions related to artificial intelligence according to the disclosure are operated through the processor 130 and the memory of the cooking device 100.

The processor 130 may consist of one or a plurality of processors 130. Here, the one or plurality of processors 130 may include at least one of a central processing unit (CPU), a graphic processing unit (GPU), or a neural processing unit (NPU), but are not limited to the aforementioned examples of the processor 130.

A CPU is a generic-purpose processor 130 that can perform not only general operations but also artificial intelligence operations, and it can effectively execute a complex program through a multilayer cache structure. A CPU is advantageous for a serial processing method that enables systemic linking of the previous calculation result and the next calculation result through sequential calculations. However, the generic-purpose processor 130 is not limited to the aforementioned examples excluding cases wherein it is specified as the aforementioned CPU.

A GPU is a processor 130 for mass operations such as a floating point operation used for graphic processing, etc., and it can perform mass operations in parallel by massively integrating cores. In particular, a GPU may be advantageous for a parallel processing method such as a convolution operation, etc. compared to a CPU. Also, a GPU may be used as a co-processor 130 for supplementing the function of a CPU. However, the processor 130 for mass operations is not limited to the aforementioned examples excluding cases wherein it is specified as the aforementioned GPU.

An NPU is a processor 130 specialized for an artificial intelligence operation using an artificial neural network, and it can implement each layer constituting an artificial neural network as hardware (e.g., silicon). Here, the NPU is designed to be specialized according to the required specification of a company, and thus it has a lower degree of freedom compared to a CPU or a GPU, but it can effectively process an artificial intelligence operation required by the company. Meanwhile, as the processor 130 specialized for an artificial intelligence operation, an NPU may be implemented in various forms such as a tensor processing unit (TPU), an intelligence processing unit (IPU), a vision processing unit (VPU), etc. However, the artificial intelligence processor 130 is not limited to the aforementioned examples excluding cases wherein it is specified as the aforementioned NPU.

Also, the one or plurality of processors 130 may be implemented as a system on chip (SoC). Here, the SoC may further include a memory, and a network interface such as a bus, etc. for data communication between the processor 130 and the memory other than the one or plurality of processors 130.

In case the plurality of processors 130 are included in the system on chip (SoC) included in the cooking device 100, the cooking device 100 may perform an operation related to artificial intelligence (e.g., an operation related to learning or inference of an artificial intelligence model) by using some processors 130 among the plurality of processors 130. For example, the cooking device 100 may perform an operation related to artificial intelligence by using at least one of a GPU, an NPU, a VPU, a TPU, or a hardware accelerator specialized for artificial intelligence operations such as a convolution operation, a matrix product operation, etc. among the plurality of processors 130. However, this is merely an example, and the cooking device 100 can process an operation related to artificial intelligence by using the generic-purpose processor 130 such as a CPU, etc.

Also, the cooking device 100 may perform an operation related to artificial intelligence by using a multicore (e.g., a dual core, a quad core, etc.) included in one processor 130. In particular, the cooking device 100 may perform artificial intelligence operations such as a convolution operation, a matrix product operation, etc. in parallel by using multicores included in the processor 130.

The one or plurality of processors 130 perform control to process input data according to pre-defined operation rules or an artificial intelligence model stored in the memory. The pre-defined operation rules or the artificial intelligence model are characterized in that they are made through learning.

Here, being made through learning means that predefined operation rules or an artificial intelligence model having desired characteristics are made by applying a learning algorithm to a plurality of learning data. Such learning may be performed in a device itself wherein artificial intelligence is performed according to the disclosure, or performed through a separate server/system.

An artificial intelligence model may consist of a plurality of neural network layers. At least one layer has at least one weight value, and performs an operation of the layer through the operation result of the previous layer and at least one defined operation. As examples of a neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks, and a Transformer, and the neural network in the disclosure is not limited to the aforementioned examples excluding cases clearly specified.

A learning algorithm is a method of training a specific subject device (e.g., a robot) by using a plurality of learning data and thereby making the specific subject device make a decision or make prediction by itself. As examples of learning algorithms, there are supervised learning, unsupervised learning, semi-supervised learning, or reinforcement learning, but learning algorithms in the disclosure are not limited to the aforementioned examples excluding cases clearly specified.

A storage medium that is readable by machines may be provided in the form of a non-transitory storage medium. Here, the term "a non-transitory storage medium" only means that the storage medium is a tangible device, and does not include signals (e.g.: electromagnetic waves), and the term does not distinguish a case wherein data is stored in the storage medium semi-permanently and a case wherein data is stored in the storage medium temporarily. For example, "a non-transitory storage medium" may include a buffer wherein data is stored temporarily.

According to one or more embodiments of the disclosure, the method according to the various embodiments described in the disclosure may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or may be distributed directly between two user devices (e.g., smartphones), and distributed on-line (e.g.: download or upload) through an application store (e.g., Play Store™). In the case of on-line distribution, at least a portion of a computer program product (e.g., a downloadable app) may be stored in a machine-readable storage medium such as the server of the manufacturer, the server of the application store, and the memory of the relay server at least temporarily, or may be generated temporarily.

Also, each of the components (e.g., a module or a program) according to the aforementioned various embodiments of the disclosure may consist of a singular object or a plurality of objects. In addition, among the aforementioned corresponding sub components, some sub components may be omitted, or other sub components may be further included in the various embodiments. Alternatively or additionally, some components (e.g., a module or a program) may be integrated as an object, and perform functions that were performed by each of the components before integration identically or in a similar manner.

Further, operations performed by a module, a program, or other components according to the various embodiments may be executed sequentially, in parallel, repetitively, or heuristically. Or, at least some of the operations may be executed in a different order or omitted, or other operations may be added.

The term "a part" or "a module" used in the disclosure may include a unit implemented as hardware, software, or firmware, and may be interchangeably used with, for example, terms such as a logic, a logical block, a component, or a circuit. In addition, "a part" or "a module" may be a component constituted as an integrated body or a minimum unit or a part thereof performing one or more functions. For example, a module may be constituted as an application-specific integrated circuit (ASIC).

Also, the various embodiments of the disclosure may be implemented as software including instructions stored in machine-readable storage media, which can be read by machines (e.g., computers). The machines refer to devices that call instructions stored in a storage medium, and can operate according to the called instructions, and the devices may include an electronic device according to the aforementioned embodiments (e.g., the cooking device 100).

In case an instruction is executed by a processor, the processor may perform a function corresponding to the instruction by itself, or by using other components under its control. An instruction may include a code that is generated or executed by a compiler or an interpreter.

Also, while embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A cooking device comprising:
a camera;
at least one memory storing at least one instruction; and
at least one processor configured to execute the at least one instruction to:
based on identifying a first event related to acquiring an image of a food ingredient arranged in the cooking device, adjust a set value for at least one parameter related to the camera and acquire a first set value,
acquire, through the camera and based on the first set value, at least one image of the food ingredient arranged in the cooking device,
based on identifying a second event while the at least one image is being acquired, acquire a second set value, acquire a first image of the food ingredient based on the second set value, and provide the first image to a user,
acquire a second image wherein the second set value used in acquiring the first image is changed to the first set value, and
input the second image into an object recognition model configured to recognize the food ingredient, and acquire information on the food ingredient based on the second image.

2. The cooking device of claim 1, wherein the at least one processor is further configured to execute the at least one instruction to:
acquire the second image by changing the second set value to the first set value in data for the first image.

3. The cooking device of claim 1, wherein the at least one processor is further configured to execute the at least one instruction to:
acquire the second image by inputting the first set value, the second set value, and the first image into a trained image acquisition model.

4. The cooking device of claim 1, further comprising:
at least one sensor,
wherein the first event comprises at least one of receiving a user input for performing a cooking operation of the cooking device, detecting through the at least one sensor that a door of the cooking device was closed, or detecting through the at least one sensor that the food ingredient is arranged in the cooking device.

5. The cooking device of claim 4, wherein the second event comprises at least one of identifying that a color of the food ingredient changed while a parameter stabilizing operation is being performed, detecting through the at least one sensor that an illumination around the cooking device changed while the parameter stabilizing operation is being performed, or receiving a user input requesting an image of the food ingredient while the parameter stabilizing operation is not being performed.

6. The cooking device of claim 1, further comprising:
a communicator,
wherein the at least one processor is further configured to execute the at least one instruction to:
based on acquiring the first image, control the communicator to transmit the first image to a user terminal of the user.

7. The cooking device of claim 1, further comprising:
a display,
wherein the at least one processor is further configured to execute the at least one instruction to:
based on acquiring the first image, control the display to display the first image.

8. The cooking device of claim 1, further comprising:
a light emitter,
wherein the at least one processor is further configured to execute the at least one instruction to:
control at least one of a color or a brightness of a light irradiated by the light emitter based on a color of the food ingredient included in the first image.

9. A method of controlling a cooking device, the method comprising:
based on identifying a first event related to acquiring an image of a food ingredient arranged in the cooking device, adjusting a set value for at least one parameter related to a camera of the cooking device and acquiring a first set value;
acquiring, through the camera and based on the first set value, at least one image of the food ingredient arranged in the cooking device;
based on identifying a second event while the at least one image is being acquired, acquiring a second set value, acquiring a first image of the food ingredient based on the second set value, and providing the first image to a user;
acquiring a second image wherein the second set value used in acquiring the first image is changed to the first set value; and
inputting the second image into an object recognition model configured to recognize the food ingredient, and acquiring information on the food ingredient based on the second image.

10. The method of claim 9, wherein the acquiring the second image further comprises:
acquiring the second image by changing the second set value to the first set value in data for the first image.

11. The method of claim 9, wherein the acquiring the second image further comprises:
acquiring the second image by inputting the first set value, the second set value, and the first image into a trained image acquisition model.

12. The method of claim 9, wherein the first event comprises at least one of receiving a user input for performing a cooking operation of the cooking device, detecting through at least one sensor that a door of the cooking device was closed, or detecting through the at least one sensor that the food ingredient is arranged in the cooking device.

13. The method of claim 12, wherein the second event comprises at least one of identifying that a color of the food ingredient changed while a parameter stabilizing operation is being performed, detecting through the at least one sensor that an illumination around the cooking device changed while the parameter stabilizing operation is being performed, or receiving a user input requesting an image of the food ingredient while the parameter stabilizing operation is not being performed.

14. The method of claim 9, further comprising:
based on acquiring the first image, transmitting the first image to a user terminal of the user.

15. The method of claim 9, further comprising:
based on acquiring the first image, displaying the first image.

16. A non-transitory computer readable medium having instructions stored therein, which when executed by at least one processor cause the at least one processor to execute a method of controlling a cooking device, the method comprising:
based on identifying a first event related to acquiring an image of a food ingredient arranged in the cooking device, adjusting a set value for at least one parameter related to a camera of the cooking device and acquiring a first set value;
acquiring, through the camera and based on the first set value, at least one image of the food ingredient arranged in the cooking device,
based on identifying a second event while the at least one image is being acquired, acquiring a second set value, acquiring a first image of the food ingredient based on the second set value, and providing the first image to a user;
acquiring a second image wherein the second set value used in acquiring the first image is changed to the first set value; and
inputting the second image into an object recognition model configured to recognize the food ingredient, and acquiring information on the food ingredient based on the second image.

17. The non-transitory computer readable medium of claim 16, wherein the acquiring the second image further comprises:
acquiring the second image by changing the second set value to the first set value in data for the first image.

18. The non-transitory computer readable medium of claim 16, wherein the acquiring the second image further comprises:
acquiring the second image by inputting the first set value, the second set value, and the first image into a trained image acquisition model.

19. The non-transitory computer readable medium of claim 16, wherein the first event comprises at least one of receiving a user input for performing a cooking operation of the cooking device, detecting through at least one sensor that a door of the cooking device was closed, or detecting through the at least one sensor that the food ingredient is arranged in the cooking device.

20. The non-transitory computer readable medium of claim 19, wherein the second event comprises at least one of identifying that a color of the food ingredient changed while a parameter stabilizing operation is being performed, detecting through the at least one sensor that an illumination around the cooking device changed while the parameter stabilizing operation is being performed, or receiving a user input requesting an image of the food ingredient while the parameter stabilizing operation is not being performed.

* * * * *